United States Patent
Okuyama et al.

(10) Patent No.: US 7,861,040 B2
(45) Date of Patent: Dec. 28, 2010

(54) MEMORY APPARATUS, CACHE CONTROL METHOD, AND CACHE CONTROL PROGRAM

(75) Inventors: Kenji Okuyama, Yokohama (JP); Tomohiro Suzuki, Nishitokyo (JP); Yuji Tamura, Hachioji (JP); Tetsuya Ishikawa, Hachioji (JP); Hiroyasu Nishimura, Hachioji (JP); Tomoya Ogawa, Hachioji (JP); Fumikage Uchida, Asaka (JP); Nao Moromizato, Hino (JP); Munetoshi Eguchi, Hachioji (JP)

(73) Assignee: Konica Minolta Business Technologies, Inc., Tokyo (JP)

(*) Notice: Subject to any disclaimer, the term of this patent is extended or adjusted under 35 U.S.C. 154(b) by 418 days.

(21) Appl. No.: 11/940,825

(22) Filed: Nov. 15, 2007

(65) Prior Publication Data

US 2008/0162822 A1    Jul. 3, 2008

(30) Foreign Application Priority Data

Dec. 28, 2006  (JP)  .............................. 2006-355586

(51) Int. Cl.
*G06F 12/00* (2006.01)

(52) U.S. Cl. .................. 711/120; 711/103; 711/104; 711/119; 711/143; 711/E12.017

(58) Field of Classification Search .................. None
See application file for complete search history.

(56) References Cited

U.S. PATENT DOCUMENTS 5,748,985 A  *  5/1998  Kanai ........................ 711/130

FOREIGN PATENT DOCUMENTS

| JP | 7-44982 | 2/1995 |
| JP | 07-121444 | 5/1995 |
| JP | 08-171515 | 7/1996 |
| JP | 11-203828 | 7/1999 |
| JP | 2002-7213 | 1/2002 |
| JP | 2004-005778 | 1/2004 |

OTHER PUBLICATIONS

Japanese Office Action dated Jan. 22, 2009.

* cited by examiner

*Primary Examiner*—Shawn X Gu
(74) *Attorney, Agent, or Firm*—Finnegan, Henderson, Farabow, Garrett & Dunner, L.L.P.

(57) ABSTRACT

A memory apparatus including: a cache control section to control a cache memory for an auxiliary storage apparatus; a volatile memory; and a nonvolatile memory, wherein the cache memory for the auxiliary storage apparatus is configured to have a volatile cache memory provided in the volatile memory and a nonvolatile cache memory provided in the nonvolatile memory, and wherein the cache control section accesses the nonvolatile cache memory using a write back method.

12 Claims, 10 Drawing Sheets

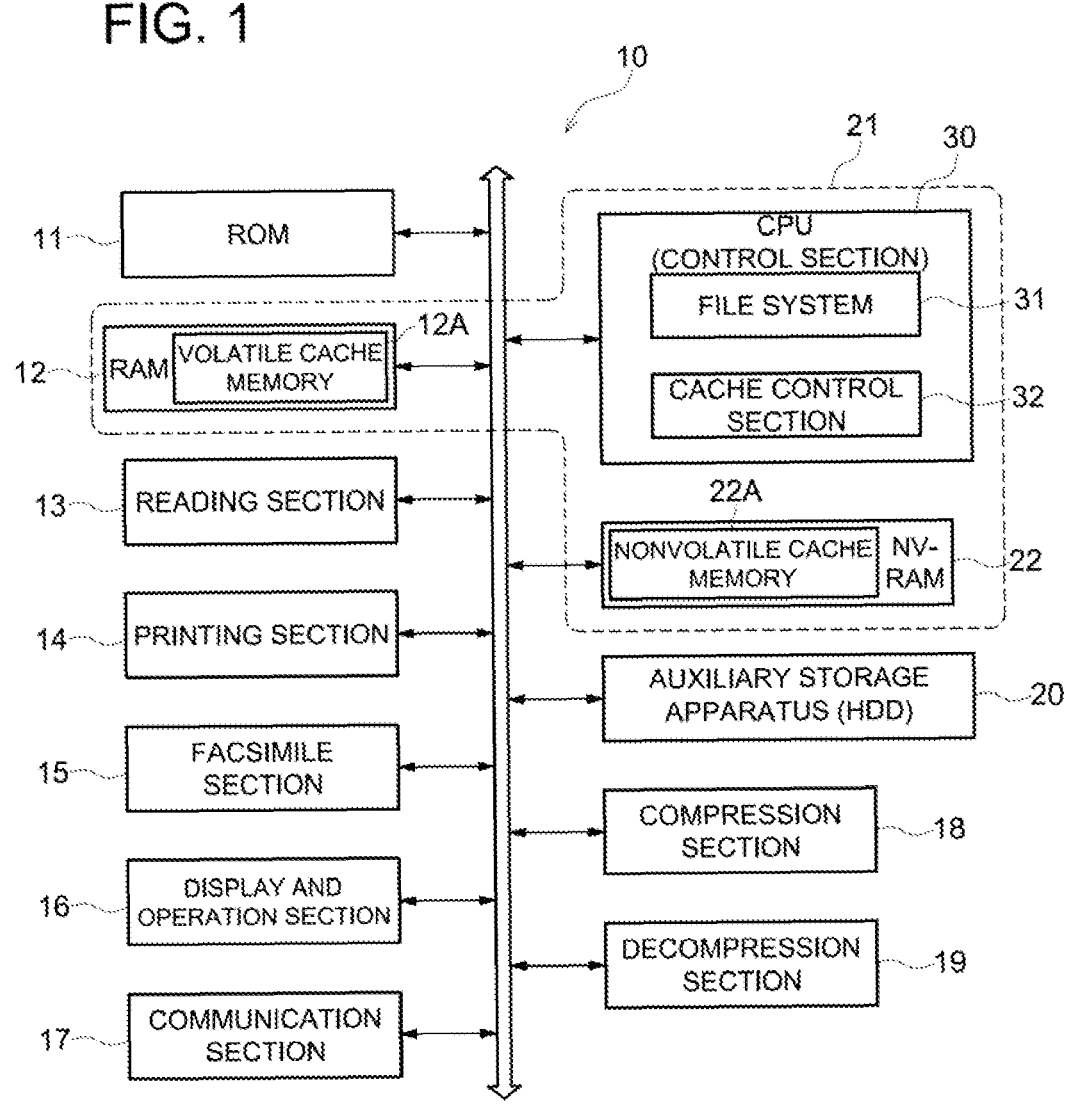

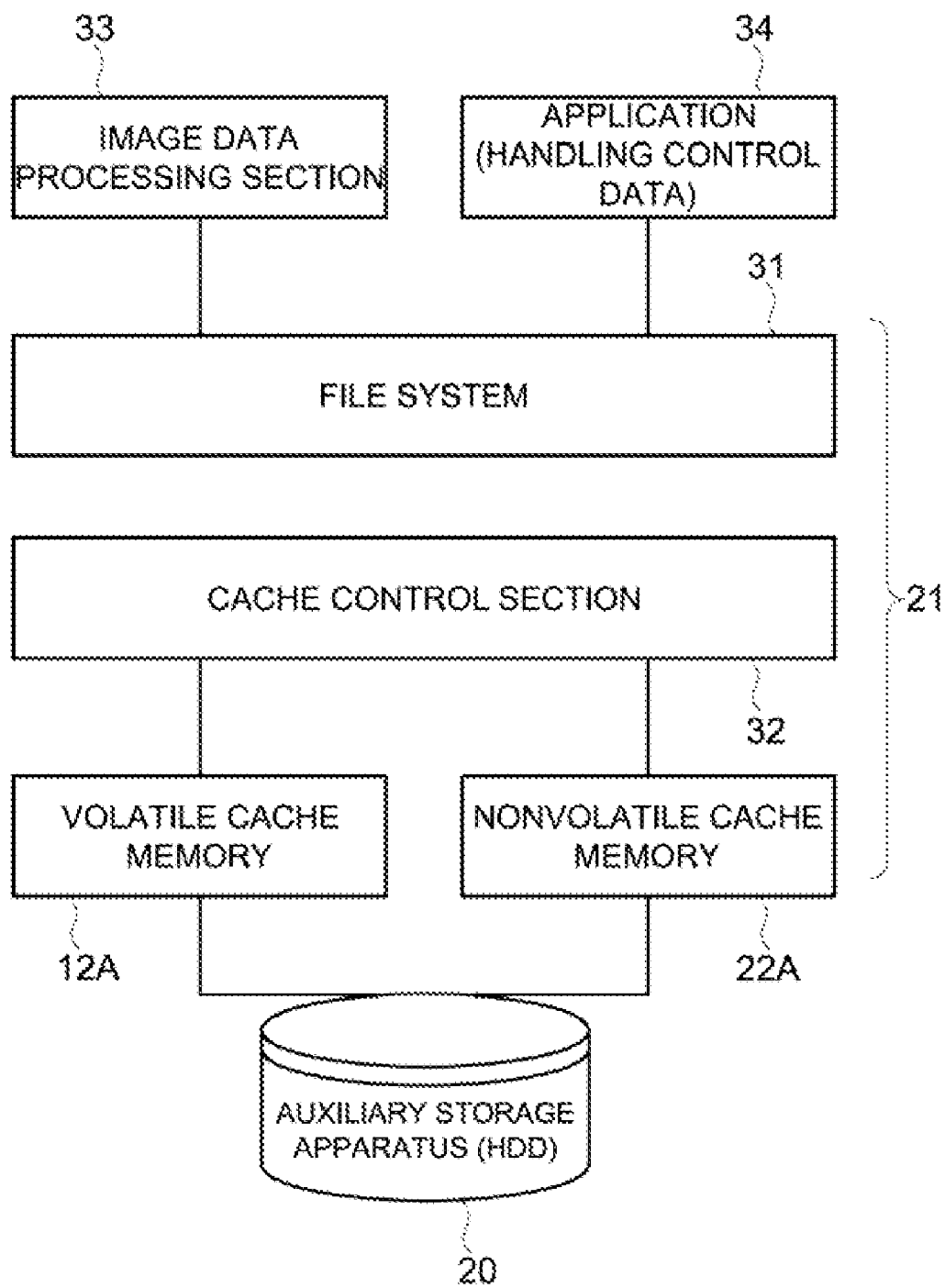

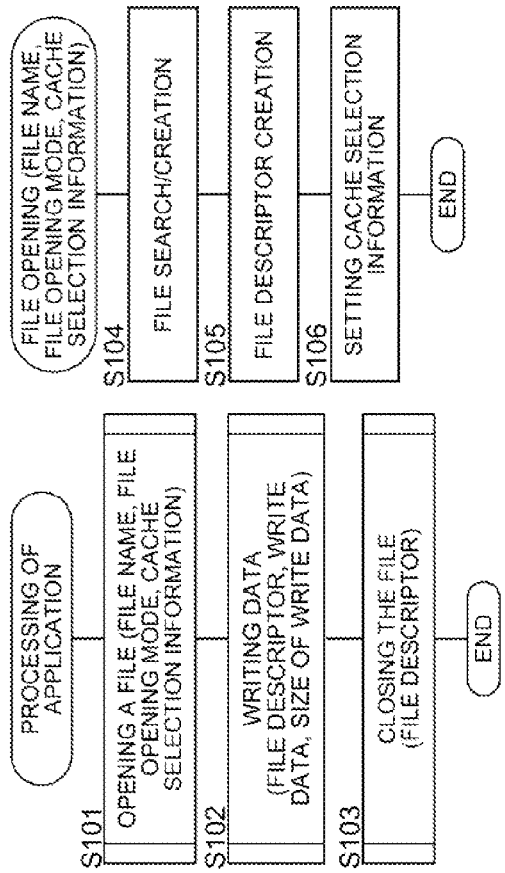
CACHE MEMORY SELECTION OPERATION DURING OPENING A FILE

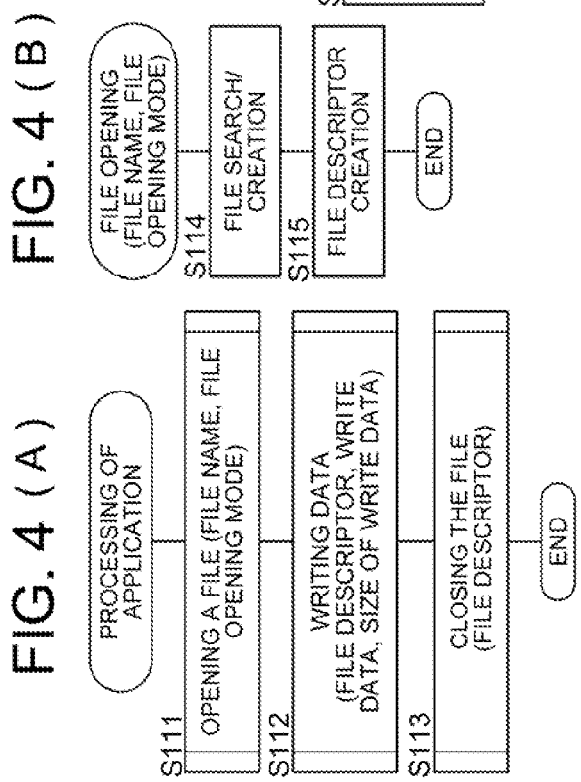

CACHE MEMORY SELECTION OPERATION BASED ON FILE SIZE DURING FILE ACCESS

OPERATION OF REGISTERING PARTICULAR BLOCKS SO THAT THEY USE THE NONVOLATILE CACHE MEMORY

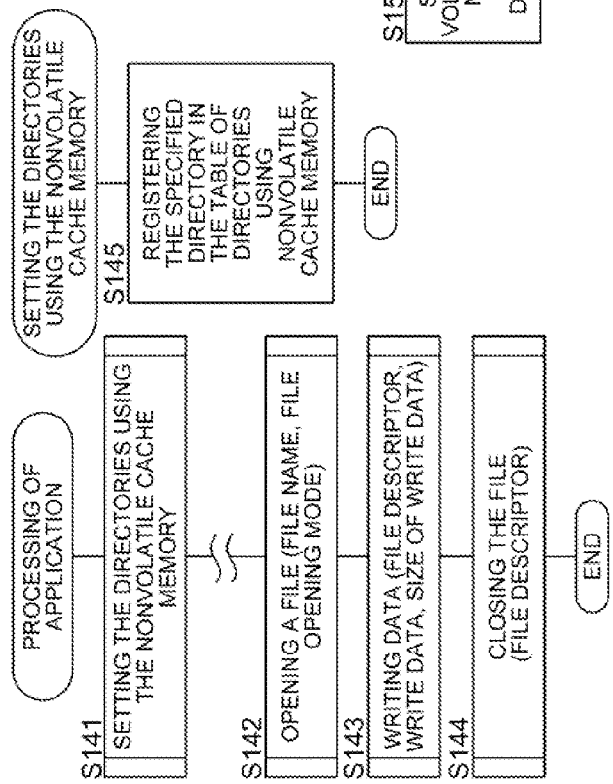

CACHE MEMORY SELECTION OPERATION DURING FILE ACCESS

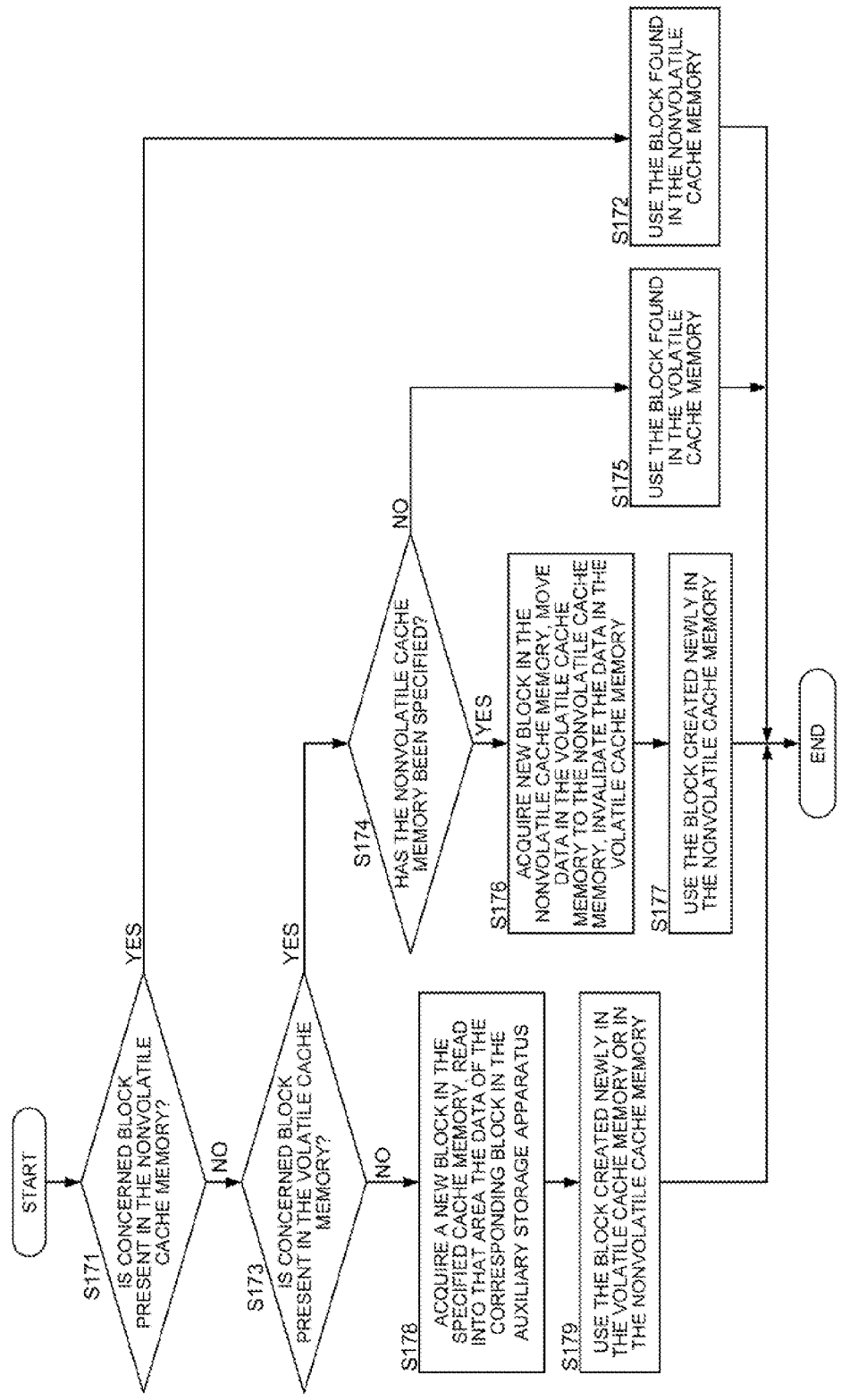

FIG. 10 (A)

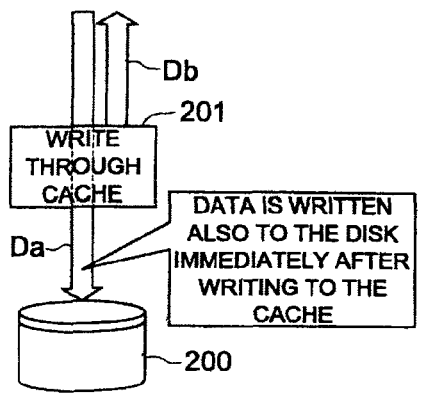

PRIOR ART

FIG. 10 (B)

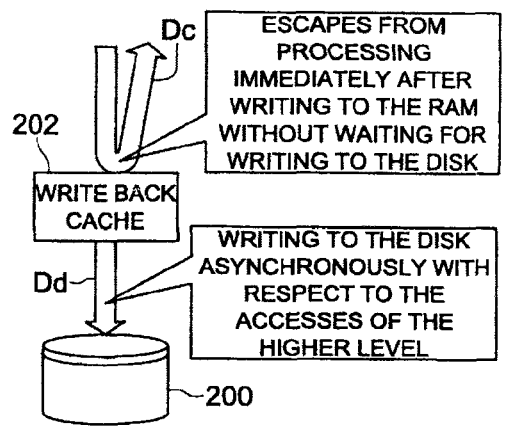

PRIOR ART

FIG. 11

|  | IMAGE DATA | CONTROL DATA |
| --- | --- | --- |
| VOLUME OF DATA ACCESSED SUCCESSIVELY | SEVERAL K-BYTES TO SEVERAL TENS OF M-BYTES | SEVERAL BYTES TO SEVERAL K-BYTES |
| FREQUENCY OF ACCESS | SUCCESSIVE | IRREGULAR, SCATTERED |
| FREQUENCY OF REPEATED ACCESS TO THE SAME BLOCK | SMALL | LARGE |
| EFFECT OF CACHE HIT | SMALL (NOT EXPECTED) | LARGE |
| PROTECTION OF DATA AGAINST UNEXPECTED POWER SUPPLY BREAKDOWNS | NOT NECESSARY AS IMAGE DATA BECAUSE THE MEASURES AGAINST POWER SUPPLY BREAKDOWNS ARE TAKEN ON THE CONTROL DATA SIDE | NECESSARY |

MEMORY APPARATUS, CACHE CONTROL METHOD, AND CACHE CONTROL PROGRAM

CROSS REFERENCE TO RELATED APPLICATION

The present application is based on Japanese Patent Application No. 2006-355586 filed with Japanese Patent Office on Dec. 28, 2006, the entire content of which is hereby incorporated by reference.

BACKGROUND OF THE INVENTION

1. Field of Technology

The present invention relates to memory apparatuses provided with cache memory that caches data stored in auxiliary storage apparatuses, to cache control methods used in such memory apparatuses, and to cache control programs used in information processing apparatuses.

2. Description of Related Art

Since the access speed of auxiliary storage apparatuses such as hard disk drives (HDD), etc. is slow compared to that of the main memory, usually they are accessed via a disk cache (cache memory) to which high speed access can be made. There are the write through method and the write back method in the common disk caches used for these auxiliary storage apparatuses.

As is shown in FIG. 10(A), in the write through method, immediately after writing the data to be written in the hard disk drive 200 in the write through cache 201, the data of the write through cache is written in the hard disk drive 200 (arrow Da), and the control is returned to the higher level after writing to the hard disk drive 200 is ended (arrow Db). Because of this, although the higher level is made to wait until the writing to the hard disk drive is completed, the interval of time during which the content of the disk cache and the content of the hard disk drive being different becomes short, and even when an unexpected power failure occurs, it becomes rare for the data of the hard disk drive becoming incomplete.

As is shown in FIG. 10(B), in the write back method, the control is returned to the higher level (arrow Dc) at the instant that the data to be written to the hard disk drive 200 is written in the write back cache 202, and the writing of data from the write back cache 202 to the hard disk drive 200 (arrow Dd) is done at a different timing. For example, the writing is done periodically at prescribed intervals, or else, the writing is done at the timing when the usable area is exhausted in the disk cache. Because of this, although the higher level is not made to wait until the writing to the hard disk drive is completed, the interval of time during which the content of the disk cache and the content of the hard disk drive being different becomes long, and if a power failure occurs, the possibility of the data of the hard disk drive going into the incomplete state becomes high.

In image, processing using an auxiliary storage apparatus via such a disk cache, because the access speed of the auxiliary storage apparatus has a large effect on the overall performance of the apparatus, in order to improve the performance it is effective to reduce the number of accesses to the auxiliary storage apparatus by using the write back method for the disk cache, thereby making sure that the data on the disk cache is not sent to the auxiliary storage apparatus as far as possible. However, since the data in the disk cache is normally erased when the power supply is switched off, if the period over which the data on the disk cache is not saved to the auxiliary storage apparatus becomes long, as has been explained above, the possibility of occurrence of inconsistency in the data due to power supply breaks (power supply ON/OFF) becomes high.

In view of this, there is a technology of ensuring safety of data towards power supply breaks while using a cache memory of the write back method by starting a back up power supply in the event of a break in the power supply, and writing the data in the cache memory to the auxiliary storage apparatus or saving it in a non-volatile memory (see, for example, Japanese Unexamined Patent Application Publication No. H7-44982 (JPA7-44982)).

Further, there is a technology of improving the performance of accesses themselves by providing a plurality of cache memories having different configurations with respect to the same storage medium, and by selecting the logical configuration (for example, the block size or the number of ways) of the cache memory according to the content of the data (see, for example, Japanese Unexamined Patent Application Publication No. 2002-7213 (JPA2002-7213)).

The data handled by an image processing apparatus has image data and control data, and the methods of handling these two types of data are largely different from each other. Therefore, if accesses are made using the same cache memory, sufficient caching effect will not be obtained.

For example, the image data is the bit map data of the image or the bit map data compressed using a prescribed algorithm. The control data is the data other than the image and is required to be stored for carrying out image processing, and for example, the following are included in the control data.

(A) Control Data of Internal File System
    FAT (File Allocation Table)
    Directory file (B) Control Data Used by the Program of the Image Processing Apparatus
    Information for controlling the image data (storage location of the image data, image parameters, etc.)
    Information related to the job under execution
    Various settings information
    Address book
    User account information
    Job history information Further, as is shown in FIG. 11, the modes of accessing these image data and control data are widely different from each other.

In detailed terms, in the case of image data, the volume of data accessed successively is from a few kilobytes to several tens of megabytes, the access frequency is continuous, the frequency of repeated accesses to the same block becomes low, and the effect is small when there is a hit in the cache (not expected). In addition, the guarantee of data regarding unexpected power failures is not necessary for image data since the power failure counter measures are taken for the control data.

On the other hand, in the case of control data, the volume of data accessed successively is from a few bytes to several tens of kilobytes, the frequency of accesses is irregular and scattered, the frequency of repeated accesses to the same block becomes high, and the effect is large when there is a hit in the cache. In addition, it is necessary to guarantee the data regarding unexpected power failures.

Regarding the two types of data with different access modes as described above, in the configuration in which there is only one configuration of the cache memory as described in JPA7-44982 above, the following problem occurs when simultaneous accesses are present via a single (or the same) cache memory.

Since repeated accesses to the same block are large in the case of control data, the effect is large when there is a hit in the cache. However, if accesses of image data are also made at the same time, most of the area of the cache memory will be consumed by the image data, and the rate of hit of control data in the cache memory becomes extremely low. If the cache hit rate of control data decreases, accesses of control data occur asynchronously during the successive accesses of image data, and hence performance decrease occurs due to seeking operation of the head in the case of a hard disk drive.

If an attempt is made to counter these problems by merely making the cache size large, a large increase will be required in the cache memory capacity that can be saved to a nonvolatile memory thereby increasing the cost. Further, although it is possible to store the image data and the control data respectively in different auxiliary storage apparatuses, the cost increases because of the increase in the number of auxiliary storage apparatuses.

Further, in the technology of JPA2002-7213, although improvement in performance is being aimed at by selecting accessing a plurality of cache memories for a plurality of information processings, no considerations have been given to protecting data against power supply breaks.

The present invention was made in order to solve the above problems, and the purpose of the present invention is to provide a memory apparatus, a cache control method, and a cache control program using which it is possible to increase the speed of processing by decreasing the accesses to the auxiliary storage apparatus and to aim at protecting the data against power supply breakdowns.

SUMMARY OF THE INVENTION

A memory apparatus reflecting one aspect of the present invention to achieve the above objectives includes: a cache control section to control a cache memory for an auxiliary storage apparatus; a volatile memory; and a nonvolatile memory, wherein the cache memory for the auxiliary storage apparatus is configured to have a volatile cache memory provided in the volatile memory and a nonvolatile cache memory provided in the nonvolatile memory, and wherein the cache control section accesses the nonvolatile cache memory using a write back method.

A cache control method reflecting another aspect of the present invention includes the steps of: configuring a cache memory for the auxiliary storage apparatus to have a volatile cache memory provided in a volatile memory and a nonvolatile cache memory provided in a nonvolatile memory; and accessing the nonvolatile cache memory using a write back method.

A computer readable medium reflecting another aspect of the present invention, in which stored a cache control program, the program allowing an information processing apparatus provided with an auxiliary storage apparatus, a cache control section to control a cache memory for the auxiliary storage apparatus, a volatile memory, and a nonvolatile memory, to realize functions of: configuring a cache memory for the auxiliary storage apparatus to have a volatile cache memory provided in the volatile memory and a nonvolatile cache memory provided in the nonvolatile memory; and accessing the nonvolatile cache memory using a write back method.

BRIEF DESCRIPTION OF THE DRAWINGS

These and other objects, advantages and features of the invention will become apparent from the following description thereof taken in conjunction with the accompanying drawings in which;

FIG. 1 is a block diagram showing the configuration of an image forming apparatus provided with a memory apparatus according to a first preferred embodiment of the present invention;

FIG. 2 is a configuration diagram showing the outline configuration of a memory apparatus according to a first preferred embodiment of the present invention;

FIGS. 3(A)-(D) are flow charts showing the operation of cache memory selection according to a first preferred embodiment of the present invention;

FIGS. 4(A)-(D) are flow charts showing the operation of cache memory selection according to a third preferred embodiment of the present invention;

FIGS. 7(A)-(D) are flow charts showing the operation of cache memory selection according to a sixth preferred embodiment of the present invention;

FIG. 9 is a flow chart showing the operation of preventing data inconsistency according to an eighth preferred embodiment of the present invention;

FIG. 10(A) is an explanatory diagram showing the write through method and FIG. 10(B) is an explanatory diagram showing the write back method as the methods of writing data to the cache memory; and FIG. 11 is a table showing the modes of accessing the image data and the control data.

DETAILED DESCRIPTION OF THE PREFERRED EMBODIMENTS

Figures 5A, 5B, 5C, 5D:
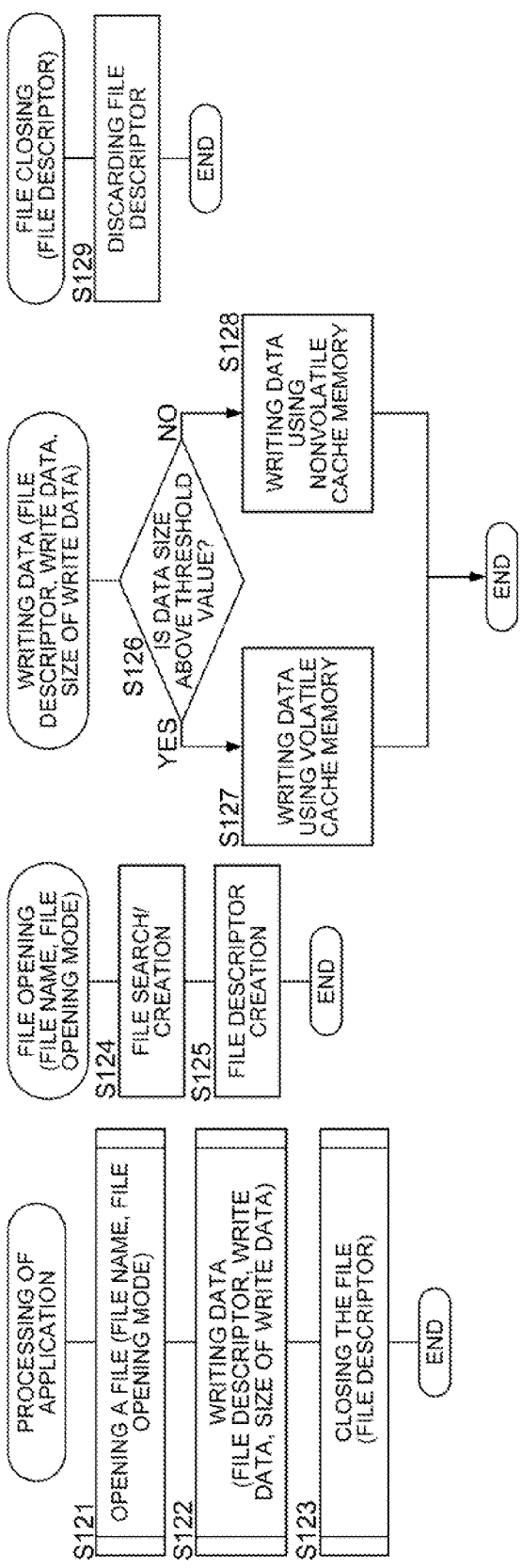
FIGS. 5(A)-(D) are flow charts showing the operation of cache memory selection according to a fourth preferred embodiment of the present invention.

The preferred embodiments of the present invention are explained below based on the drawings.

First Preferred Embodiment

FIG. 1 shows the configuration of an image forming apparatus 10 having a memory apparatus 21 according to a first preferred embodiment of the present invention. The image forming apparatus 10 is configured as a digital MFP (Multi Functional Peripheral) that has, apart from the copying function of reading a document and forming the corresponding image on a recording paper, the scanner function, the printer function, the facsimile function, etc. Further, it also has functions such as the function of compressing and storing the image data obtained by reading out the document, the function of transmitting to an external apparatus the stored image data using email or FTP (Pile Transfer Protocol), the function of calling out a stored image and printing it.

In order to realize these functions, the image forming apparatus 10 has a CPU (Central Processing Unit) 30 as the control section that comprehensively controls the operation of the entire apparatus, a ROM (Read Only Memory) 11, a RAM (Random Access Memory) 12, and a nonvolatile RAM (NV-RAM) 22, ail forming the main parts of the circuits.

ROM 11 stores the programs executed by the CPU 30 and various types of fixed data.

RAM 12 functions as a working storage for temporarily storing various types of data at the time that the CPU 30 executes various programs, and as a page memory for storing at least one page of image data for carrying out rotation operation etc. The image data stored in RAM 12 is the bit map data of the image or the bit map data compressed using a prescribed algorithm, etc. A volatile cache memory 12A that functions as the cache memory is provided in this RAM 12.

The NV-RAM 22 is a nonvolatile memory that retains the stored contents even if the power supply is switched off, and in this NV-RAM 22 are stored the prescribed data that need to be stored even after the power supply is switched OFF, such as, various types of parameter that are unique to the apparatus, the control data that need to be stored for carrying out image processing. The control data has the control data used by the programs of the image forming apparatus 10 (information for managing the image data, such as the storage location of image data, image parameters, etc., information related to the job being executed, various types of settings information, address book, user account information, job history information). In this NV-RAM 22 is provided a nonvolatile cache memory 22A that functions as the cache memory. In addition, the NV-RAM 22 uses the write back method as the method of writing the data (caching method).

The reading section 13 has the function of reading out the image of the document and taking in the corresponding image data. The reading section 13 is provided with a light source that illuminates the document, a line image sensor that reads out one line of the document along its width direction, a movement section that moves the document reading position in units of a line along the length direction of the document, and an optical path having lenses and mirrors that guide and focus the light reflected from the document to the line image sensor. The line image sensor includes a CCD (Charge Coupled Device). The analog image signal output by the line image sensor is A/D converted, if further converted into binary signals by error dispersion processing, etc., and is output as a digital image signal.

The printing section 14 carries out the function of forming an image corresponding to the image data on the recording sheet using an electro-photographic process and outputs that sheet. The printing section 14 is constituted as a so-called laser printer having a recording sheet conveying apparatus, a photoreceptor drum, a charging unit, a laser unit, a developing unit, a transfer and separation unit, a cleaning unit, and a fixing unit. The facsimile section 15 is the part that carries out the function as a facsimile apparatus. This carries out the functions of compressing and expanding the image data using a compression method corresponding to facsimile standards, and the function of controlling various types of communication procedures for carrying out facsimile transmission and reception.

The display and operation section 16 is constituted from a liquid crystal display provided with a touch panel on its surface and various types of operation switches, and has the function of carrying out various user guidance displays and status displays, and accepting various types of operations by the user. The communication section 17 has the function of carrying out communication by connected to telephone lines or various types of networks.

The compression section 18 carries out the function of compressing the image data, and the decompression section 19 carries out the function of decompressing the compressed data into the original image data.

The auxiliary storage apparatus 20 is a large capacity storage device, and in this preferred embodiment, a hard disk drive (HDD) is being used as the auxiliary storage apparatus. The auxiliary storage apparatus 20 is used for storing compressed image data and for storing various types of control data. In addition, the volatile cache memory 12A in the RAM 12 and the nonvolatile cache memory 22A in the NV-RAM 22 are used as the cache memories for accessing the auxiliary storage apparatus 20.

The CPU 30 which is the control section carrying out the functions of the file system 31 and the cache control section 32.

The memory apparatus 21 according to the present preferred embodiment is constituted to have a RAM 12 a part of whose area is being used as the volatile cache memory 12A, an NV-RAM 22 a part of whose area is being used as the nonvolatile cache memory 22A, and a CPU 30 provided with a cache control section 32 for controlling the volatile and nonvolatile cache memories 12A and 22A, and an outline configuration diagram of this memory apparatus is shown in FIG. 2.

As is shown in FIG. 2, the memory apparatus 21 is provided with a file system 31, a cache control section 32, a volatile cache memory 12A, a nonvolatile cache memory 22a, and the configuration is such that the image data processing section 33 or other applications 34 access the data of the auxiliary storage apparatus 20 via the file system 31.

The file system 31 carries out the control functions for storing various types of data in the auxiliary storage apparatus 20 in a file format. The file system 31 prepares the directory for storing the files or their entries in the auxiliary storage apparatus 20, moves or deletes these, and controls the attribute information of the files. The locations of files or directories in the file system 31 are controlled in a tree structure with the root directory at the vertex, the path is the route from the vertex up to the desired file or directory according to that tree structure, and the path name is the description of this path.

At the time of opening a file, the file system 31 prepares the file descriptor for registering various information related to that file, and when the file is open, it executes accesses to that file while referring to the information in that file descriptor. At the time of closing the file, the file system 31 has the function of discarding the file descriptor of that file.

In the file descriptor, various information are registered, such as, the file name, opening mode, file size, leading block, leading position, writing position, status/access rights, file owner, etc. The identification information (file handle) of the file descriptor created during file opening processing is returned as the return value of that processing to the calling process. Thereafter, in the processing at the calling process, the file is identified using this file handle, and the read and write processings of the file are carried out. Further, even after a file is closed, the information that has to be stored in a nonvolatile manner is registered in the auxiliary storage apparatus 20 while establishing correspondence with the file.

The image data processing section 33 carries out reading and writing processing of image data via the file system 31.

The application 34 handles data including various control data but excluding the image data, and carries out the read and write processings of that data via the file system 31.

The cache control section 32 selects which of the volatile cache memory 12A and the nonvolatile cache memory 22A is to be used, and carries out control of accessing the nonvolatile memory 22A in the write back method.

Next, the cache control operations (selection of the volatile and nonvolatile cache memories 12A and 22A) in the image forming apparatus 10 including the memory apparatus 21 of the above configuration is explained below.

FIGS. 3(A)-(D) show the flow of the operation of selecting the cache memory in an image forming apparatus 10 according to the present preferred embodiment when a file is opened by an application.

In the present preferred embodiment, at the time that the image data processing section 33 or an application 34 opens a file, a specification is made as to whether to use the volatile cache memory 12A or to use the nonvolatile cache memory 22A. When the image data processing section 33 opens a file, it specifies the volatile cache memory 12A, and when an application 34 that handles control data opens a file, it specifies the nonvolatile cache memory 22A.

For example, as is shown in FIG. 3(A), in the processing by an application, the image data processing section 33/application 34 carries out the processings of opening a file (Step S101) using the file name, opening mode, and cache selection information as the arguments, and writing data into the file (Step S102) using the file descriptor, the data to be written, and the size of the data to be written as the arguments, and closing the file (Step S103) using the file descriptor as the argument, and then ends the processing by the application (END).

As is shown in FIG. 3(B), the file system 31, in the processing of opening a file, searches the existing files based on the arguments (the file name, opening mode, and cache selection information), or else creates a new file (Step S104), generates a file descriptor for that file (Step S105), and, in the file descriptor, sets the cache selection information (Step S106) that indicates the specification of the volatile cache memory 12A when the image data processing section 33 opens the file, or the specification of the nonvolatile cache memory 22A when an application 34 handling control data opens the file, and then ends the processing of opening a file (END).

As is shown in FIG. 3(C), the file system 31, in the processing of writing data to a file, selects the volatile or nonvolatile cache memory 12A or 22A based on the cache selection information written in the file descriptor according to the arguments (file descriptor, data to be written in the file, and the size of the data to be written), and writes data to the file (Step S107), and ends the processing of writing data to the file (END). Because of this, the volatile cache memory 12A is specified at the time the image data processing section 33 opens a file, and the image data is written into the volatile cache memory 12A. Further, the nonvolatile cache memory 22A is specified at the time that the application 34 opens a file, and the control data is written to the nonvolatile cache memory 22A using the write back method.

As is shown in FIG. 3(D), the file system 31, in the processing of closing a file, discards the file descriptor (Step S108) according to the argument (file descriptor), and ends the processing of closing the file (END). Along with this, the cache selection information is erased.

As has been explained above, in an image forming apparatus 10 provided with a memory apparatus 21 according to the present preferred embodiment, because the application (image data processing section 33 or the application 34) makes a setting, according to the type of the data (image data or control data) to be stored in the auxiliary storage apparatus 20, of whether to use the volatile cache memory 12A or to use the nonvolatile cache memory 22A at the time of opening a file, thereafter, the accesses of data until the file is closed are made using of the volatile cache memory 12A or the nonvolatile cache memory 22A according to the type of data. Further, the volatile cache memory 12A is used for accessing image data, and the nonvolatile cache memory 22A is used for accessing control data, and hence it is possible, for example, to prevent the image data and the control data from consuming the same cache memory thereby interfering with each other. Because of this, the cache hit rate of control data increases, and as a consequence, the accesses of the auxiliary storage apparatus 20 related to control data during the accesses of image data are reduced. Therefore, it is possible to speed up the accessing process of the entire apparatus.

Further, during the accesses of the control data using the nonvolatile cache memory 22A, not only the protection is increased against power breakdowns, but also, because of using the write back method, the processing can be speeded up by reducing the accesses to the auxiliary storage apparatus 20.

In addition, by providing the two types of cache memories of the volatile and nonvolatile cache memories 12A and 22A for the same auxiliary storage apparatus 20, it is possible to realize, for example, cache memories that do not interfere with each other during the accesses to the different data, similar to the configuration of storing two types of data individually in different auxiliary storage apparatuses. Therefore, without inducing reduction in the processing speed, it is possible to suppress increases in the cost due to increases in the number of auxiliary storage apparatuses.

Further, in the control of the cache memories (selection of the volatile or nonvolatile cache memories 12A and 22A), because whether to use either the volatile cache memory 12A or to use the nonvolatile cache memory 22A is being selected at the time of opening the file to be accessed, the setting needs to be made only once from opening the file until closing it, and compared to, for example, the case of making the setting for each access, the load on the application (image data processing section 33 or the application 34) can be reduced, thereby making it possible to simplify the processing.

Second Preferred Embodiment

Next, the cache memory selection operation in the image forming apparatus 10 according to a second preferred embodiment of the present invention is explained below.

In the present preferred embodiment, an interface is provided in the file system 31 through which it is possible to set, as a file attribute information, from the application (the image data processing section 33 or the application 34) whether it is a file using the volatile cache memory 12A or it is a file using the nonvolatile cache memory 22A, and via this interface, the attribute information is set so that the volatile cache memory 12A is used for image files and the nonvolatile cache memory 22A is used for control data.

This attribute information is saved in the directory entry at the time of creating the file, and is read into the file descriptor at the time of opening the file.

Modifying the setting of the attribute information is carried out at any timing by executing a prescribed system call that modifies the attribute information.

Next, at the time of accessing the file, the file system 31 selects either the volatile cache memory 12A or the nonvolatile cache memory 22A by referring to the attribute information registered in the file descriptor, and then writes data to the file. Because of this, image files are written in the volatile cache memory 12A and control data are written in the nonvolatile cache memory 22A using the write back method.

As has been explained above, in the present preferred embodiment, because of selecting to use either the volatile cache memory or the nonvolatile cache memory using the attribute information of the file, since the setting needs to be done only once, the processing on the application (the image data processing section 33 or the application 34) side can be reduced by lowering the number of settings. In addition, because the right of determination is given to the application side, even the processing on the file system 31 side is reduced.

Third Preferred Embodiment

FIGS. 4(A)-(D) show the flow of the operation of selecting the cache memory in an image forming apparatus 10 according to a third preferred embodiment of the present invention.

In the present preferred embodiment, a prescribed threshold value (for example, several hundred bytes) is provided on the side of the file system 31 for the size of one access specified by the application (the image data processing section 33 or the application 34) to the file system 31, and the volatile cache memory 12A is used if the size is more than or equal to this threshold value, or else the nonvolatile cache memory 22A is used if the size is less than this threshold value. This threshold value is saved in a nonvolatile manner, for example, in the auxiliary storage apparatus 20 as an internal information of the file system 31, and is read out and set from that nonvolatile storage at the time of starting the file system 31 (image forming apparatus 10).

For example, as is shown in FIG. 4(A), in the processing by the application, the image data processing section 33 or the application 34 carries out the processings of opening a file using the file name and the opening mode as the arguments (Step S111), writing data in the file using the file descriptor, the data to be written, and the size of the data to be written as the arguments (Step S112), and closing the file using the file descriptor as the argument (Step S113), and the processing of the application is ended (END).

As is shown in FIG. 4(B), the file system 31, in the processing of opening a file, searches the existing files based on the arguments (the file name, opening mode), or else creates a new file (Step S114), generates a file descriptor for that file (Step S115), and then ends the processing of opening the file (END).

As is shown in FIG. 4(C), the file system 31, in the processing of writing data to a file, makes a judgment as to whether or not the size of the data to be written is above the threshold value (Step S116) based on the arguments (file descriptor, data to be written in the file, and the size of the data to be written). If the size is not less than the threshold value (Yes in Step S116), it writes data to the file using the volatile cache memory (Step S117), or else, if the size is less than the threshold value (No in Step S116), it writes the data to the file using the nonvolatile cache memory 22A in the write back method (Step S118), and ends the processing of writing data to the file (END). Therefore, since the size of one access of image data (volume of data accessed successively) is large being from several kilobytes to several tens of megabytes, it is judged to be not less than the threshold value and is written to the volatile cache memory 12A. Further, since the size of one access of control data is small being from several bytes to several tens of kilobytes, it is judged to be less than the threshold value and is written to the nonvolatile cache memory 22A using the write back method.

As is shown in FIG. 4(D), the file system 31, in the processing of closing a file, discards the file descriptor (Step S119) according to the argument (file descriptor), and ends the processing of closing the file (END).

As has been explained above, in the present preferred embodiment, the cache memory to be used is selected based on the data size per file access. In other words, by setting the threshold value for judging which of the volatile cache memory 12A and the nonvolatile cache memory 22A to use so that access size of image data$\geq$threshold value>access size of control data, the nonvolatile cache memory 12A is used for accesses of the image data, and the nonvolatile cache memory 22A is used for the accesses of the control data. Because of this, it is possible to prevent the image data and the control data consuming the same cache memory and interfering with each other, and an effect similar to that of the first preferred embodiment is obtained.

Further, because the selection of the cache memory to be used (judgment based on the threshold value) is made by the file system 31, the load on the application 34 side is reduced. In addition, since there is no need for making settings, the operation becomes simpler.

Fourth Preferred Embodiment

FIGS. 5(A)-(D) show the flow of the operation of selecting the cache memory in an image forming apparatus 10 according to a fourth preferred embodiment of the present invention.

In the present preferred embodiment, a prescribed threshold value (for example, several hundred bytes) is provided on the side of the file system 31 for the file size, and at the time of an access specified by the application (the image data processing section 33 or the application 34) to the file system 31, the volatile cache memory 12A is used if the size is more than or equal this threshold value, or else the nonvolatile cache memory 22A is used if the size is less than this threshold value. This threshold value, as in the third preferred embodiment, is saved in a nonvolatile manner, for example, in the auxiliary storage apparatus 20 as an internal information of the file system 31, and is read out and set from that nonvolatile storage at the time of starting the file system 31 (image forming apparatus 10).

For example, as is shown in FIG. 5(A), in the processing by the application, the image data processing section 33 or the application 34 carries out the processings of opening a file using the file name and the opening mode as the arguments (Step S121), writing data in the file using the file descriptor, the data to be written, and the size of the data to be written as the arguments (Step S122), and closing the file using the file descriptor as the argument (Step S123), and the processing of the application is ended (END).

As is shown in FIG. 5(B), the file system 31, in the processing of opening a file, searches the existing files based on the arguments (the file name, opening mode), or else creates a new file (Step S124), generates a file descriptor for that file (Step S125), and then ends the processing of opening the file (END).

As is shown in FIG. 5(C), the file system 31, in the processing of writing data to a file, makes a judgment as to whether or not the size of the file which is the target of writing data is above the threshold value (Step S126). If the size is not less than the threshold value (Yes in Step S126), it writes data to the file using the volatile cache memory (Step S127), or else, if the size is less than the threshold value (No in Step S126), it writes the data to the file using the nonvolatile cache memory 22A in the write back method (Step S128), and ends the processing of writing data to the file (END). Therefore, since the file size of image data is large, it is judged to be not less than the threshold value and is written to the volatile cache memory 12A. Further, since the file size of control data is small, it is judged to be less than the threshold value, and is written to the nonvolatile cache memory 22A using the write back method.

As is shown in FIG. 5(D), the file system 31, in the processing of closing a file, discards the file descriptor (Step S129) according to the argument (file descriptor), and ends the processing of closing the file (END).

As has been explained above, in the present preferred embodiment, the cache memory to be used is selected based on the size of the file to be accessed. In other words, by setting the threshold value for judging which of the volatile cache memory 12A and the nonvolatile cache memory 22A to use so that file size of image data≧threshold value>file size of control data, the nonvolatile cache memory 12A is used for accesses of the image data, and the nonvolatile cache memory 22A is used for the accesses of the control data. Because of this, it is possible to prevent the image data and the control data consuming the same cache memory and interfering with each other, and an effect similar to that of the first preferred embodiment is obtained.

Further, because appropriate selection becomes possible according to the file size, and also, because the selection can be made using only the current information, the load on the application 34 side is reduced. In addition, since there is no need for making settings, the operation becomes simpler.

Fifth Preferred Embodiment

Figure 6A:
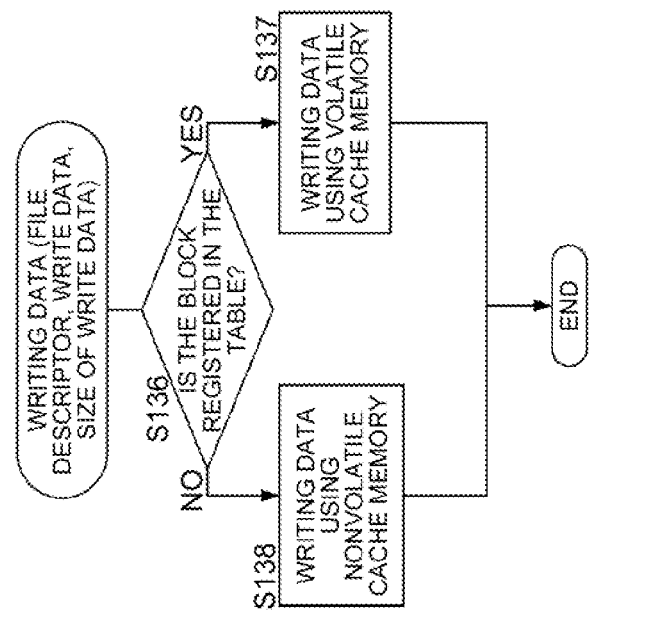
FIGS. 6(A)-(C) are flow charts showing the operation of cache memory selection according to a fifth preferred embodiment of the present invention.
Figure 6B:
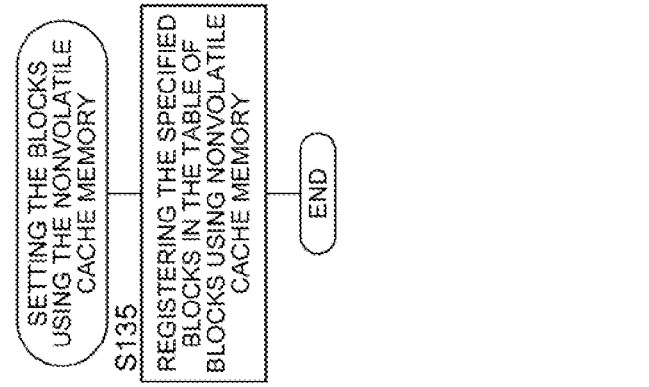
Figure 6C:
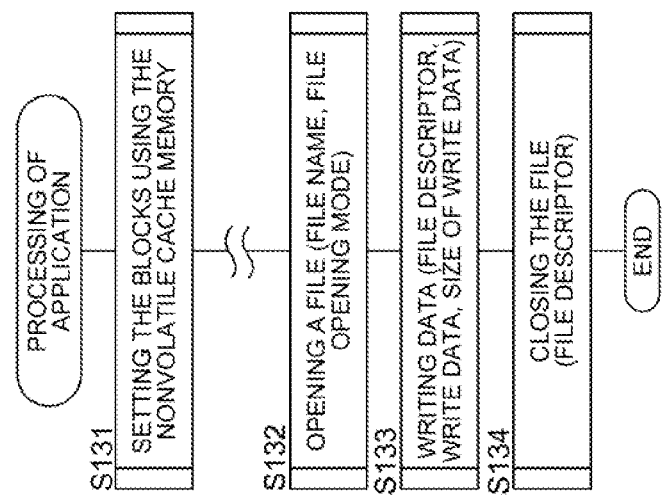

FIGS. 6(A)-(C) show the flow of the operation of selecting the cache memory in an image forming apparatus 10 according to a fifth preferred embodiment of the present invention.

In the present preferred embodiment, on the side of the file system 31, the nonvolatile cache memory 22A is used if the block of the auxiliary storage apparatus 20 that has been requested to be accessed is a particular block, and the volatile cache memory 12A is used if it is not the particular block. The particular blocks can be determined within the file system 31, or can be registered by the application (the image data processing section 33 or the application 34). The blocks that are determined within the file system 31, are the control data used within the file system such as, for example, the FAT, or the directory files (directory entries). Further, for the case in which the particular blocks are registered by the application, it is possible to provide an interface in the file system 31 that registers and removes particular blocks.

For example, as is shown in FIG. 6(A), in the processing of the application, after the image data processing section 33 or the application 34 executes the setting (the initial setting) of the blocks using the nonvolatile cache memory 22A (Step S131), it carries out the processings of opening a file using the file name and the opening mode as the arguments (Step S132), writing data in the file using the file descriptor, the data to be written, and the size of the data to be written as the arguments (Step S133), and closing the file using the file descriptor as the argument (Step S134), and the processing of the application is ended (END).

As is shown in FIG. 6(B), the file system 31, in the processing of setting the blocks that use the nonvolatile cache memory 22A, registers the specified blocks of the auxiliary storage apparatus 20 in the table of blocks that use the nonvolatile cache memory (Step S135), and then ends the processing of setting the blocks (END).

As is shown in FIG. 6(C), the file system 31, in the processing of writing data to a file, makes a judgment as to whether or not the block whose access is requested has been registered in the table of the blocks that use the nonvolatile cache memory 22A (Step S136) based on the arguments (file descriptor, data to be written in the file, and the size of the data to be written). If it has been registered (Yes in Step S136), it writes the data to the file using the nonvolatile cache memory 22A in the write back method (Step S137), or else, if it has not been registered (No in Step S136), it writes the data to the file using the volatile cache memory 12A (Step S138), and ends the processing of writing data to the file (END). Because of this, it is possible to write the image files to the volatile cache memory 12A, and to write the control data to the nonvolatile cache memory 22A in the write back method.

Further, the explanations of the file opening processing and the file closing processing by the file system 31 are omitted here as they are identical to the contents described in the third and fourth preferred embodiments. Further, the table of the blocks that use the nonvolatile cache memory 22A, similar to the third and fourth preferred embodiments, is saved in a nonvolatile manner, for example, in the auxiliary storage apparatus 20 as an internal information of the file system 31, and is read out and set from that nonvolatile storage at the time of starting the file system 31 (image forming apparatus 10).

As has been explained above, in the present preferred embodiment, by using the nonvolatile cache memory 22A when the block whose access is requested is a particular block, and by using the volatile cache memory 12A when the block to be accessed is not a particular block, it is possible to use the different cache memory areas in a balanced manner according to the amount of allocation of particular blocks, and to aim at smoothening the processing. In addition, if a particular folder is registered as those particular blocks, the appropriate cache memory will be selected according to the application.

Sixth Preferred Embodiment

FIGS. 7(A)-(D) show the flow of the operation of selecting the cache memory in an image forming apparatus 10 according to a sixth preferred embodiment of the present invention.

In the present preferred embodiment, by setting so that either the volatile cache memory 12A or the nonvolatile cache memory 22A is used for particular directories, the file system 31 uses either one of the volatile cache memory 12A and the nonvolatile cache memory 22A when accessing files under those particular directories, and uses the other cache memory when accessing files present in other directories. For the particular directories, an interface can be provided in the file system 31 for registering or removing the particular directories, and the settings of registering or removing the particular directories can be made using that interface.

In the file system 31, it is possible to change the settings of the particular directories freely using the above interface. Therefore, for example, in the case in which all the files under particular directories are made image files, the setting is made to use the volatile cache memory 12A for all files under the particular directories, or else, on the other hand, if the setting is made so that all files under the particular directories are to be used for control data, then the setting is made so that all files under the particular directories use the nonvolatile cache memory 22A.

For example, as is shown in FIG. 7(A), in the processing of the application, after the image data processing section 33 or the application 34 executes the setting (the initial setting) of the directories using the nonvolatile cache memory 22A (Step S141), it carries out the processings of opening a file using the file name and the opening mode as the arguments (Step S142), writing data in the file using the file descriptor, the data to be written, and the size of the data to be written as the arguments (Step S143), and closing the file using the file descriptor as the argument (Step S144), and the processing of the application is ended (END).

As is shown in FIG. 7(B), the file system 31, in the processing of setting the directories that use the nonvolatile cache memory 22A, registers files under the specified directories as those for control data that use the nonvolatile cache memory in the table of directories (Step S145), and then ends the processing of setting the directories (END).

As is shown, in FIG. 7(C), the file system 31, in the processing of opening a file, searches the existing files based on the arguments (the file name and opening mode), or else creates a new file (Step S146), and generates a file descriptor for that file (Step S147). Next, it makes a judgment as to whether or not the directory whose access has been requested has been registered in the table of directories that use the nonvolatile cache memory 22A (Step S148). If it has been registered (Yes in Step S148), it sets the cache selection information of using the nonvolatile cache memory 22A in the file descriptor (Step S149), or else, if it has not been registered (No in Step S148), it sets the cache selection information of using the volatile cache memory 12A in the file descriptor (Step S150), and then ends the processing of opening a file (END).

As is shown in FIG. 7(D), the file system 31, in the processing of writing data to a file, selects the volatile or nonvolatile cache memory 12A or 22A based on the cache selection information written in the file descriptor according to the arguments (file descriptor, data to be written in the file, and the size of the data to be written), and writes data to the file (Step S151), and ends the processing of writing data to the file (END). Because of this, the control data stored in particular directories are specified to the nonvolatile cache memory 22A and are written using the write back method. Also, the image files stored in other directories are specified for using the volatile cache memory 12A and are written to that cache.

Further, since the processing of closing a file is the same as that described in the third and fourth preferred embodiments, its explanation will be omitted here. Also, the table of directories using the nonvolatile memory, similar to that in the third to the fifth preferred embodiments, is saved in a nonvolatile manner, for example, in the auxiliary storage apparatus 20 as an internal information of the file system 31, and is read out and set from that nonvolatile storage at the time of starting the file system 31 (image forming apparatus 10).

As has been explained above, in the present preferred embodiment, by using a directory of the file system 31 for the selection of either one of the volatile cache memory 12A and the nonvolatile cache memory 22A, and by determining particular directories to be for image data or for control data, it becomes possible to make the settings in a simple manner.

Seventh Preferred Embodiment

FIGS. 8(A)-(D) show the flow of the operation of selecting the cache memory in an image forming apparatus 10 according to a seventh preferred embodiment of the present invention.

In the present preferred embodiment, the image data processing section 33 or the application 34 specify, at the time of accessing a file, whether to use the volatile cache memory 12A or to use the nonvolatile cache memory 22A.

Figures 8A, 8B, 8C, 8D:
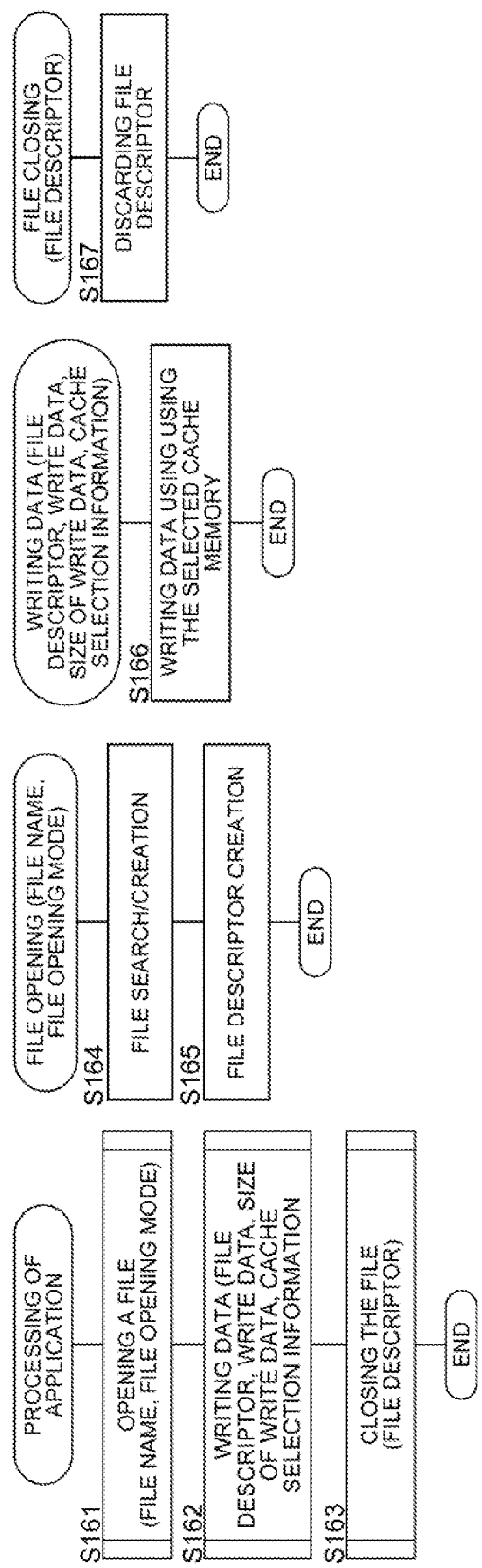
FIGS. 8(A)-(D) are flow charts showing the operation of cache memory selection according to a seventh preferred embodiment of the present invention.

For example, as is shown in FIG. 8(A), in the processing of the application, the image data processing section 33 or the application 34 carries out the processings of opening a file using the file name and the opening mode as the arguments (Step S161), writing data in the file using the file descriptor, the data to be written, the size of the data to be written, and the cache selection information as the arguments (Step S162), and closing the file using the file descriptor as the argument (Step S163), and the processing of the application is ended (END). Here, it has been determined in advance that, when the image data processing section 33 accesses a file, the volatile cache memory 12A is specified by the cache selection information, and when an application 34 handling control data accesses a file, the nonvolatile cache memory 22A is specified by the cache selection information.

As is shown in FIG. 8(B), the file system 31, in the processing of opening a file, searches the existing files based on the arguments (the file name, opening mode), or else creates a new file (Step S164), generates a file descriptor for that file (Step S165), and then ends the processing of opening the file (END).

As is shown in FIG. 8(C), the file system 31, in the processing of writing data to a file, selects either the volatile or the nonvolatile cache memory 12A or 22A based on the cache selection information specified in the arguments (file descriptor, data to be written in the file, the size of the data to be written, and the cache selection information) and according to the arguments, writes data to the file (Step S166), and ends the processing of writing data to the file (END). Here, since it has been determined in advance that, when the image data processing section 33 accesses a file, the volatile cache memory 12A is specified by the cache selection information, and when an application 34 handling control data accesses a file, the nonvolatile cache memory 22A is specified by the cache selection information, image data is written to the volatile cache memory 12A, and the control data is written, to the nonvolatile cache memory 22A using the write back method.

As is shown in FIG. 8(D), the file system 31, in the processing of closing a file, discards the file descriptor (Step S167) according to the argument (file descriptor), and ends the processing of closing the file (END).

As has been explained above, in the present preferred embodiment, because one of the volatile cache memory 12A and the nonvolatile cache memory 22A is selected at the time of accessing a file, it is not necessary for the file system 31 to store the cache selection information in the file descriptor, etc. In addition, it also becomes possible for the application (the image data processing section 33 or the application 34) to change the type of cache memory used for each access.

Further, the selection of the volatile cache memory and the nonvolatile cache memory 12A and 22A based on the type of data explained in the first to the seventh preferred embodiments is the result, and each of the operations of selecting the cache memory are determined by the settings and various conditions described above (such as, for example, the relationship between the access size and the threshold value, etc.). Therefore, by making the settings and various conditions equal to the contents explained in the first to the seventh preferred embodiments above, as a result, the volatile cache memory 12A is used for accesses of image data, and the nonvolatile cache memory 22A is used for accesses of the control data, and these data accessing the same cache memory and conflicting with each other is prevented.

Eighth Preferred Embodiment

Excluding the fourth preferred embodiment, the data of the same block, of the auxiliary storage apparatus 20 may be accessed via the volatile cache memory 12A or via the nonvolatile cache memory 22A. Therefore, if the data of the same block is present in duplicate in both the volatile cache memory 12A and the nonvolatile cache memory 22A at the same time, different data will be present for the same block, and hence inconsistencies will be present in the data. Therefore, in order to prevent such data inconsistencies, at the time of searching for blocks by the cache memory, the processing explained below is executed.

FIG. 9 is a flow chart showing the operation of preventing data inconsistency according to an eighth preferred embodiment of the present invention.

In each of the processings of cache memory selection excepting in the fourth preferred embodiment, as is shown in FIG. 9, a judgment is made as to whether or not corresponding block is present in the nonvolatile cache memory 22A (Step S171). If corresponding block is present in the nonvolatile cache memory 22A (Yes in Step S171), the block found in the nonvolatile cache memory 22A is used (Step S172), and the processing is ended (END). If corresponding block is not present in the nonvolatile cache memory 22A (No in Step S171), a judgment is made as to whether or not corresponding block is present in the volatile cache memory 12A (Step S173).

If corresponding block is present in the volatile cache memory 12A (Yes in Step S173), a judgment is made as to whether or not it has been specified for the nonvolatile cache memory 22A (Step S174). If it has not been specified (No in Step S174), the block found in the volatile cache memory 12A is used (Step S175), and the processing is ended (END). If it has been specified (Yes in Step S174), a new block is acquired in the nonvolatile cache memory 22A, and the data in the volatile cache memory 12A is moved to the nonvolatile cache memory 22A. In addition, the data in the volatile cache memory 12A is made invalid (Step S176). Next, the newly created block in the nonvolatile cache memory 22A is used (Step S177), and the processing is ended (END).

Further, if corresponding block is not present in the volatile cache memory 12A (No in Step S173), a new block is acquired in the specified cache memory, and the data of the corresponding block in the auxiliary storage apparatus 20 is read into that area (Step S178). Next, the block prepared newly in the volatile cache memory 12A or in the nonvolatile cache memory 22A is used (Step S179), and the processing is ended (END).

By executing the above processing, it is possible to prevent the data of the same block being present simultaneously in both the volatile and the nonvolatile cache memories 12A and 22A, and hence it is possible to prevent the occurrence of data inconsistency.

In the above, although some preferred embodiments of the present invention have been described referring to the drawings, the concrete configuration is not restricted to those indicated in the preferred embodiments, and even if any modifications or additions are present within the scope and intent of the present invention, they shall be construed to be included in the present invention.

For example, regarding each of the processings of selecting the cache memory described in the first to the seventh preferred embodiments, in addition to carrying them out individually, it is also possible to carry out two or more them in combinations.

Further, the NV-RAM 22 provided in the image forming apparatus 10 is one that is present in the usual digital MFPs, and in the preferred embodiment, by using a part of the NV-RAM 22 as the nonvolatile cache memory 22A, the cost of installing a new nonvolatile memory is being eliminated. However, it is also possible to have a configuration in which a separate nonvolatile memory independent of the NV-RAM 22 is allocated as the nonvolatile cache memory 22A. Further, instead of having a configuration of placing the nonvolatile cache memory 22A directly on the nonvolatile memory (NV-RAM 22), it is also possible to have a configuration in which the nonvolatile cache memory is placed in the RAM so as to be saved to the NV-RAM 22 in the event of a break in the power supply, thereby effectively carrying out the function of a nonvolatile cache memory.

Further, in the preferred embodiments, although the memory apparatus according to the present invention was applied to an image forming apparatus and the cache memories are used separately for image data and control data, the data handled by the memory apparatus need not be restricted to these two types. For example, it is possible to use the cache memories separately for different types of data having different characteristics such as the need or otherwise for protecting the data against power supply breaks, the data size, the access size, etc., (between voice data and control data, or, between text data with different levels of importance, etc.). In this manner, the memory apparatus according to the present invention is not limited to an image forming apparatus, but can be applied appropriately to information processing apparatuses handling various types of data.

According to the embodiment of the present invention, when the data to be stored in the auxiliary storage apparatus can be acceptable with low protection level against power breakdowns, the data is accessed by using the cache memory provided on the volatile memory. While, when the data is required high level protection against power breakdowns, the data is accessed by using the cache memory provided on nonvolatile memory with the write back method.

In this way, according to the type or characteristics of the data stored in the auxiliary storage apparatus, the data is accessed by using the volatile cache memory or by using the nonvolatile cache memory. Therefore, it is possible, for example, to prevent the two types of data from consuming the same cache memory thereby interfering with each other. Because of this, decrease of the cache hit rate of one type of the data when two types of data are accessed at the same time can be prevented, and as a consequence, the accesses of one type of data during the accesses of another type of data are reduced. Therefore, it is possible to speed up the accessing process of the entire apparatus.

Further, during the accesses of the data using the nonvolatile cache memory, not only the protection is increased against power breakdowns, but also, because of using the write back method, the processing can be speeded up by reducing the accesses to the auxiliary storage apparatus.

In addition, by providing the two types of cache memories of the volatile and nonvolatile cache memories and for the same auxiliary storage apparatus, it is possible to realize, for example, cache memories that do not interfere with each other during the accesses to the different data, similar to the configuration of storing two types of data individually in different auxiliary storage apparatuses. Therefore, without inducing reduction in the processing speed, it is possible to suppress increases in the cost due to increases in the number of auxiliary storage apparatuses.

According to the embodiment of the present invention, for example, when applying to the image forming apparatus which handles the image data and the control data, the image data, which is acceptable with low protection level against power breakdowns, is accessed by using the volatile cache memory, while the control data, which is required high level protection against power breakdowns is accessed by using the nonvolatile cache memory. Therefore, high data protection can be achieved for the control data, which is preferable.

According to the embodiment of the present invention, at the time of opening the file to be accessed, by setting the cache memory selection information indicating which to use the volatile or nonvolatile cache memory, when the application accesses the file to open it, selection can be possible whether to use the volatile or nonvolatile cache memory. For example, when the application of processing the image data (image data processing section) opens the file, volatile cache memory is specified, while the application of handling the control data opens the file, nonvolatile cache memory is specified. Then, the setting information (cache memory selection information) is discarded at the time of closing the file.

In this way, toy selecting whether to use either the volatile or nonvolatile cache memory at the time of opening the file to be accessed, the setting needs to be made only once from opening the file until closing it, and compared to, for example, the case of making the setting for each access, the load on the application can be reduced, thereby making it possible to simplify the processing.

According to the embodiment of the present invention, by setting, as the attribute information of the file, the cache memory selection of which to use the volatile or nonvolatile cache memory, the file system becomes capable of selecting either the volatile or the nonvolatile cache memory at the time of accessing the file. This attribute information becomes possible to be set, for example, by providing an interface, which enables the setting from the application, on the file system. And this attribute information is stored even after the file is closed.

In this way, by selecting to use either the volatile cache memory or the nonvolatile cache memory using the attribute information of the file, since the setting needs to be done only once, the number of settings is reduced and the processing on the application side can be reduced. In addition, because the right of determination is given to the application side, even the processing on the file system side is also reduced.

According to the embodiment of the present invention, a prescribed threshold value (for example, several hundred bytes) is provided on the side of the file system for the size of one access specified by the application to the file system, and the volatile cache memory is used if the size is more than or equal to this threshold value and determined to be the image file, or else the nonvolatile cache memory is used if the size is less than this threshold value and determined to be the control data.

In this way, by selecting which to use either the volatile cache memory or the nonvolatile cache memory based on a data size per file access, the loads in the application side can be decreased. Further, since setting process is not necessary, the operation can be simplified.

According to the embodiment of the present invention, a prescribed threshold value (for example, several kilo bytes) is provided for a file size, for example, on the side of the file system, and the volatile cache memory is used if the size is more than or equal to this threshold value and determined to be the image file, or else the nonvolatile cache memory is used if the size is less than this threshold value and determined to be the control data.

In this way, by selecting which of the volatile or nonvolatile cache memory is used, based on the size of the file to be accessed, an appropriate selection according to the file size can be possible. Further, since the selection can be done only with the present information, the load on the application side is reduced. In addition, since there is no need for making settings, the operation becomes simpler.

According to the embodiment of the present invention, on the side of the file system, for example, if the block of the auxiliary storage apparatus requested to be accessed is a particular block, the data in the block is determined to be the control data, and nonvolatile cache memory is used, while if the block is not the particular block, the data in the block is determined to be the image data, and the volatile cache memory is used.

In this way, by using the nonvolatile cache memory when the block whose access is requested is a particular block, and by using the volatile cache memory when the block is not a particular block, if is possible to use each of the cache memory areas in a balanced manner according to the amount of allocation of particular blocks, and to smoothen the processing. In addition, if a particular folder is registered as those particular blocks, the appropriate cache memory will be selected according to the application.

According to the embodiment of the present invention, for example, by assuming particular directories of the file system as the image file, the volatile cache memory is used when accessing files under the particular directories, and nonvolatile memory is used when accessing the other files. In other alternative, by assuming particular directories in the file system as the control data, the nonvolatile cache memory is used when accessing files under the particular directories, and volatile memory is used when accessing the other files.

In this way, by using a directory of the file system for the selection of either one of the volatile cache memory and the nonvolatile cache memory, it becomes possible to make the settings in a simple manner.

According to the memory apparatus, cache control method, and cache control program of the present invention, it is possible to realize speeding up of the processing due to reductions in the accesses to the auxiliary storage apparatus, and protection of data against power breakdowns.

What is claimed is:

1. A memory apparatus, comprising:
a cache control section to control a cache memory for an auxiliary storage apparatus;
a volatile memory; and
a nonvolatile memory,
wherein the cache memory for the auxiliary storage apparatus is configured to have a volatile cache memory provided in the volatile memory and a nonvolatile cache memory provided in the nonvolatile memory,
wherein the cache control section accesses the nonvolatile cache memory using a write back method, and
wherein at a time of opening a file to be accessed, the cache control section sets cache memory selection information indicating which of the volatile cache memory or the nonvolatile cache memory is used, and based on the cache memory selection information, selects a cache memory which is used for an access to the file.

2. A memory apparatus, comprising:
a cache control section to control a cache memory for an auxiliary storage apparatus;
a volatile memory; and
a nonvolatile memory,
wherein the cache memory for the auxiliary storage apparatus is configured to have a volatile cache memory provided in the volatile memory and a nonvolatile cache memory provided in the nonvolatile memory,
wherein the cache control section accesses the nonvolatile cache memory using a write back method, and
wherein the cache control section sets information indicating which of the volatile cache memory or the nonvolatile cache memory is used, as attribute information of a file, and based on the attribute information, selects a cache memory which is used for an access to the file.

3. A memory apparatus, comprising:
a cache control section to control a cache memory for an auxiliary storage apparatus;
a volatile memory; and
a nonvolatile memory,
wherein the cache memory for the auxiliary storage apparatus is configured to have a volatile cache memory provided in the volatile memory and a nonvolatile cache memory provided in the nonvolatile memory, wherein the cache control section accesses the nonvolatile cache memory using a write back method, and wherein the cache control section selects which of the volatile cache memory or the nonvolatile cache memory is used, based on a data size per file access.

4. A memory apparatus, comprising:
a cache control section to control a cache memory for an auxiliary storage apparatus;
a volatile memory; and
a nonvolatile memory,
wherein the cache memory for the auxiliary storage apparatus is configured to have a volatile cache memory provided in the volatile memory and a nonvolatile cache memory provided in the nonvolatile memory,
wherein the cache control section accesses the nonvolatile cache memory using a write back method, and
wherein the cache control section selects which of the volatile cache memory or the nonvolatile cache memory is used, based on a size of a file to be accessed.

5. A cache control method, comprising:
configuring a cache memory for the auxiliary storage apparatus to have a volatile cache memory provided in a volatile memory and a nonvolatile cache memory provided in a nonvolatile memory;
accessing the nonvolatile cache memory using a write back method;
setting cache memory selection information indicating which of the volatile cache memory or the nonvolatile cache memory is used, at a time of opening a file to be accessed; and
selecting a cache memory which is used for an access to the file based on the cache memory selection information.

6. A cache control method, comprising:
configuring a cache memory for the auxiliary storage apparatus to have a volatile cache memory provided in a volatile memory and a nonvolatile cache memory provided in a nonvolatile memory;
accessing the nonvolatile cache memory using a write back method;
setting information indicating which of the volatile cache memory or the nonvolatile cache memory is used, as attribute information of a file; and
selecting a cache memory which is used for an access to the file, based on the attribute information.

7. A cache control method, comprising:
configuring a cache memory for an auxiliary storage apparatus to have a volatile cache memory provided in a volatile memory and a nonvolatile cache memory provided in a nonvolatile memory;
accessing the nonvolatile cache memory using a write back method; and
selecting which of the volatile cache memory or the nonvolatile cache memory is used, based on a data size per file access.

8. A cache control method, comprising:
configuring a cache memory for an auxiliary storage apparatus to have a volatile cache memory provided in a volatile memory and a nonvolatile cache memory provided in a nonvolatile memory;
accessing the nonvolatile cache memory using a write back method; and
selecting which of the volatile cache memory or the nonvolatile cache memory is used, based on a size of a file to be accessed.

9. A computer readable medium stored thereon a cache control program, which allows an information processing apparatus provided with an auxiliary storage apparatus, a cache control section to control a cache memory for the auxiliary storage apparatus, a volatile memory, and a nonvolatile memory, to realize functions of:
configuring the cache memory for the auxiliary storage apparatus to have a volatile cache memory provided in the volatile memory and a nonvolatile cache memory provided in the nonvolatile memory;
accessing the nonvolatile cache memory using a write back method;
setting cache memory selection information indicating which of the volatile cache memory or the nonvolatile cache memory is used, at a time of opening a file to be accessed; and
selecting a cache memory which is used for an access to the file based on the cache memory selection information.

10. A computer readable medium storage thereon a cache control program, which allows an information processing apparatus provided with an auxiliary storage apparatus, a cache control section to control a cache memory for the auxiliary storage apparatus, a volatile memory, and a nonvolatile memory, to realize functions of:
configuring the cache memory for the auxiliary storage apparatus to have a volatile cache memory provided in the volatile memory and a nonvolatile cache memory provided in the nonvolatile memory;
accessing the nonvolatile cache memory using a write back method;
setting information indicating which of the volatile cache memory or the nonvolatile cache memory is used, as attribute information of a file; and
selecting a cache memory which is used for an access to the file, based on the attribute information.

11. A computer readable medium stored thereon a cache control program, which allows an information processing apparatus provided with an auxiliary storage apparatus, a cache control section to control a cache memory for the auxiliary storage apparatus, a volatile memory, and a nonvolatile memory, to realize functions of:
configuring the cache memory for the auxiliary storage apparatus to have a volatile cache memory provided in the volatile memory and a nonvolatile cache memory provided in the nonvolatile memory;
accessing the nonvolatile cache memory using a write back method; and
selecting which of the volatile cache memory or the nonvolatile cache memory is used, based on a data size per file access.

12. A computer readable medium stored thereon a cache control program, which allows an information processing apparatus provided with an auxiliary storage apparatus, a cache control section to control a cache memory for the auxiliary storage apparatus, a volatile memory, and a nonvolatile memory, to realize functions of:
configuring the cache memory for the auxiliary storage apparatus to have a volatile cache memory provided in the volatile memory and a nonvolatile cache memory provided in the nonvolatile memory;
accessing the nonvolatile cache memory using a write back method; and
selecting which of the volatile cache memory or the nonvolatile cache memory is used, based on a size of a file to be accessed.

* * * * *